United States Patent Office 2,973,772
Patented Mar. 7, 1961

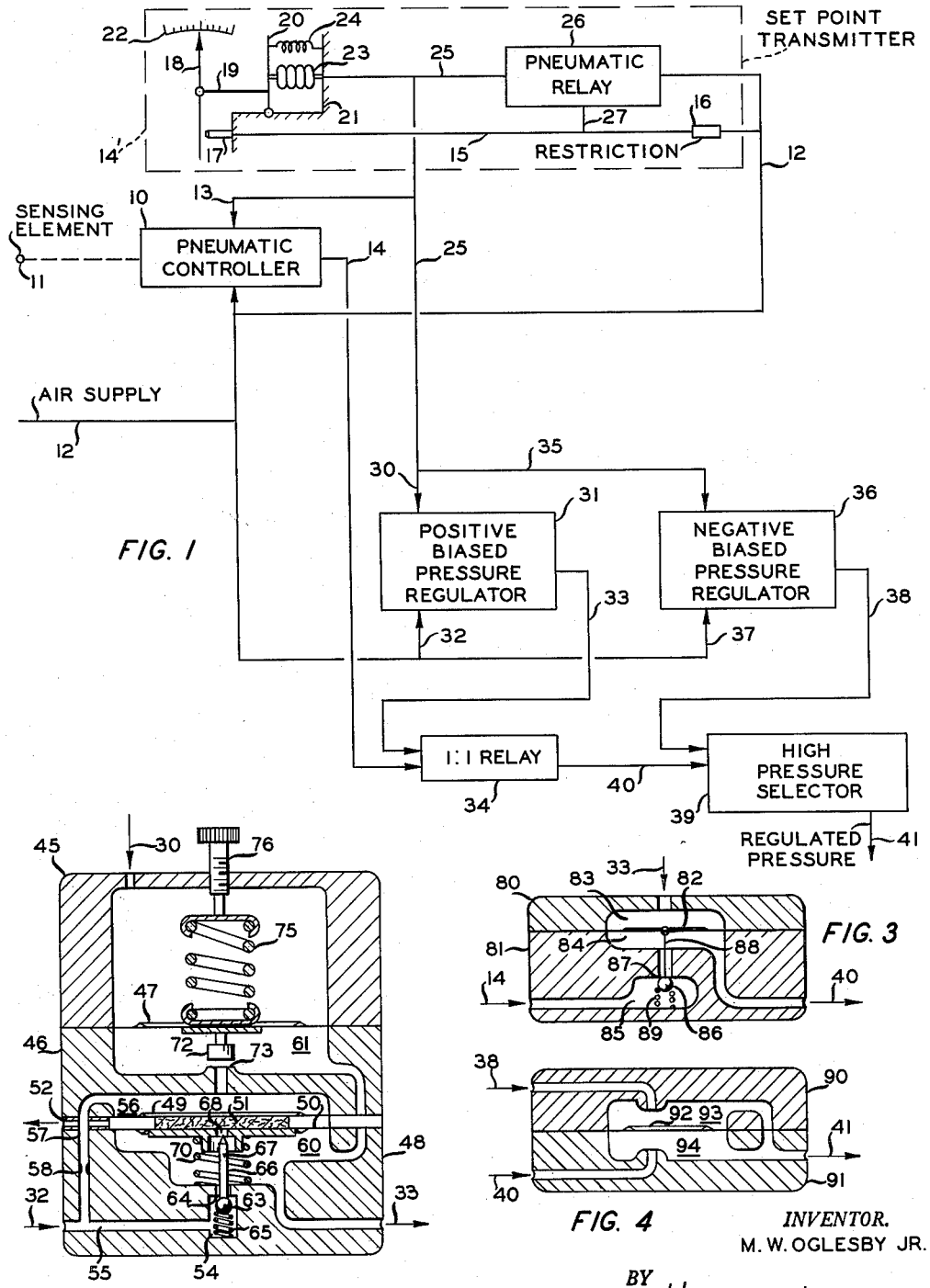

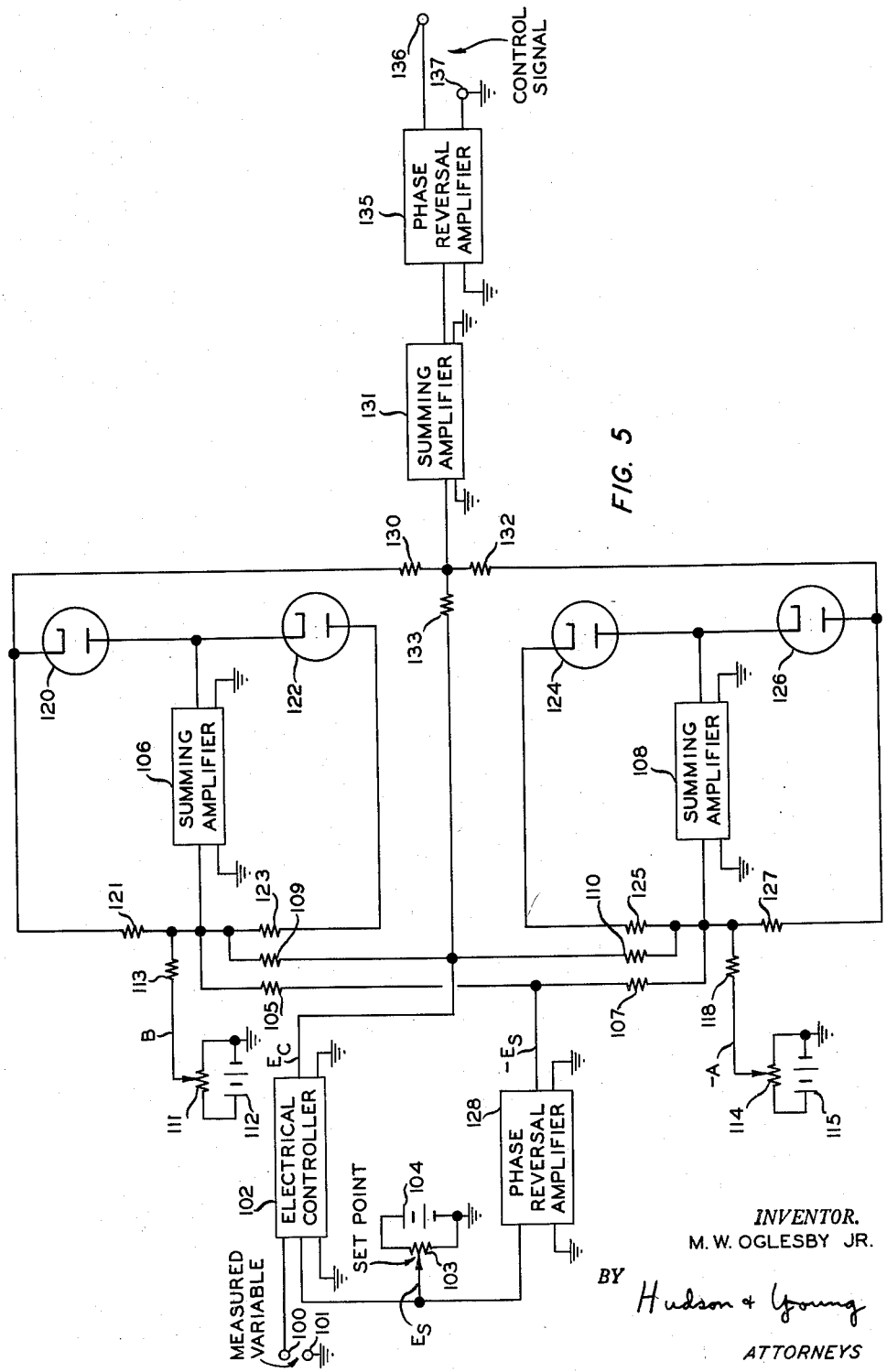

2,973,772

CONTROLLER LIMIT SYSTEM

Minor W. Oglesby, Jr., Bartlesville, Okla., assignor to Phillips Petroleum Company, a corporation of Delaware Filed Feb. 20, 1959, Ser. No. 794,758

7 Claims. (Cl. 137—82)

This invention relates to apparatus for maintaining the output signal of a controller within predetermined limits.

Automatic controllers are employed extensively in industrial operations to maintain selected variables constant or within predetermined limits. For example, in the chemical and petroleum industries, numerous automatic control systems have been developed which adjust process variables in response to measurements of conditions such as temperature, pressure, flow, liquid level, pH, density, composition, and the like. These control systems commonly employ either a pneumatic or an electrical controller which establishes a signal representative of the variable being measured. This signal, in turn, automatically adjusts a condition which affects the operation of the process. For safety purposes, it is generally desirable to provide the controller with some type of limit stops so that the output signal is not permitted to vary outside a predetermined range. Such safety limit stops prevent drastic upsets in a process which might occur if there were a malfunction in either the sensing element or the controller.

Numerous controllers which are presently available are provided with adjustable safety limit stops of the type described. However, all of these limit stops must be set manually. If it is desired to change the set point of the controller, it then becomes necessary to adjust the safety limit stops to accommodate the new set point. Otherwise, the limit stops remain at the previous setting.

In accordance with the present invention there is provided an improved system for limiting the output signal of a controller. This limit system is responsive to the set point on the controller and limits the output signal of the controller at all times so that it cannot be varied more than a predetermined amount from the set point. The limit stops thus "float" with the set point and automatically assume positions which bracket the set point. This system can be employed in conjunction with any conventional controller. Two specific embodiments of the limit system are disclosed which can be used with pneumatic and electrical controllers.

Accordingly, it is an object of this invention to provide an improved limit system to maintain the output signal of a controller within a predetermined range.

A further object is to provide an improved controller having floating adjustable safety limit stops.

Other objects, advantages and features of the invention should become apparent from the following detailed description which is taken in conjunction with the accompanying drawing in which:

Figure 1 is a schematic representation of a first embodiment of the limit system of this invention which is employed with a pneumatic controller.

Figure 2 is a schematic representation of a biased pressure regulator which can be employed in the limit system of Figure 1.

Figure 3 is a schematic representation of a 1:1 relay which can be employed in the limit system of Figure 1.

Figure 4 is a schematic representation of a high pressure selector which can be employed in the limit system of Figure 1.

Figure 5 is a schematic circuit drawing of a second embodiment of the limit system of this invention which is employed with an electrical controller.

Referring now to the drawing in detail and to Figure 1 in particular, there is shown a pneumatic controller 10 which can be any conventional process controller known in the art. Numerous types of such controllers are available commercially. The output signal from a sensing element 11 is applied to the input of controller 10. Sensing element 11 can provide a signal representative of any process variable which it is desired to measure. For example, this sensing element can measure a temperature, a pressure, a flow, or any other condition to be controlled. Air under pressure is applied to controller 10 by means of a supply conduit 12. A conduit 13 applies a pressure to controller 10 from a set point transmitter 14' which establishes a signal representative of the desired value to be maintained by controller 10. Controller 10 establishes an output pneumatic pressure in a conduit 14 which is representative of any deviation of the measured variable from the desired set point. As is well known, this output pressure can be employed for automatic control purposes.

As mentioned, set point transmitter 14' establishes a pneumatic pressure which represents the desired condition to be maintained. A conduit 15, which has a restriction 16 therein, communicates between conduit 12 and a stationary nozzle 17. A flapper 18 is pivotally attached to a rod 19 which extends from a lever 20 that is pivotally attached to a support 21. Flapper 18 can thus be adjusted to control the rate at which air bleeds from nozzle 17. The position of flapper 18 is indicated by a dial 22. A bellows 23 and a spring 24 extend between lever 20 and support 21. The interior of bellows 23 is connected to a conduit 25 which is connected to the outlet of a pneumatic relay 26. A conduit 27 extends between conduit 15 and the control inlet of relay 26. Conduit 12 supplies air under pressure to relay 26. The pressure in conduit 25 is thus proportional to and greater than the pressure in conduit 15. Conduit 13 is connected to conduit 25.

The set point of controller 10 can be adjusted manually by moving flapper 18. If it is desired to increase the set point, flapper 18 is moved in a counterclockwise direction about the pivot point so as to restrict further the opening of nozzle 17. This increases the pressure in conduit 15 which, in turn, increases the pressure in conduit 25 by a proportional amount. The increased pressure in conduit 25 is applied to the set point of controller 10 by conduit 13. The increased pressure in conduit 25 tends to expand bellows 23 against the restraining force of spring 25 so as to rotate lever 20 in a counterclockwise direction. This moves flapper 18 to the left so that the distance between flapper 18 and nozzle 17 is increased. The apparatus is adjusted so that this feedback network through bellows 23 establishes a new position of flapper 18 to restrict nozzle 17 by an amount such that the desired increased pressure is applied to controller 10.

A conduit 30 extends between conduit 25 and one inlet of a positive biased pressure regulator 31. A conduit 32 extends between conduit 12 and the second inlet of pressure regulator 31. The output pressure from regulator 31 is transmitted by a conduit 33 to the first inlet of a 1:1 relay 34. Conduit 14 is connected to the second inlet of relay 34. A conduit 35 extends between conduit 25 and the first inlet of a negative biased pressure regulator 36. A conduit 37 extends between conduit 12 and the second inlet of pressure regulator 36. The output pressure of regulator 36 is transmitted through a conduit 38 to the first inlet of a high pressure selector 39. A conduit 40 communicates between the outlet of relay 34 and the second inlet of selector 39. A conduit 41 is connected to the outlet of selector 39 to transmit a regulated pressure which is the limited controller output signal.

Pressure regulator 31 is set manually so that the output pressure in conduit 33 is greater than the input pressure in conduit 30 by a predetermined amount. Pressure regulator 36 is set manually so that the output pressure in conduit 38 is less than the input pressure in conduit 35 by a predetermined amount. As long as the set points of pressure regulators 31 and 36 are not varied, the pressure differential between conduits 33 and 38 remains constant despite variations in the set point pressure in conduit 25. Pressures 33 and 38 thus represent the two limit pressures of the controller. Relay 34 operates in such a manner that the output pressure in conduit 40 is equal to the controller pressure in conduit 14 as long as the pressure in conduit 14 is less than the pressure in conduit 33. If the pressure in conduit 14 exceeds the upper limit pressure in conduit 33, the output pressure in conduit 40 becomes equal to the pressure in conduit 33 and does not exceed this limit. The output pressure in condiut 41 is equal to the larger of the pressures supplied by conduits 38 and 40. Thus, if the pressure in conduit 40 should fall below the lower set point pressure in conduit 38, the pressure in conduit 38 is transmitted to establish the lower limit.

A suitable pressure regulator for use as elements 31 and 36 is illustrated schematically in Figure 2. The pressure regulator comprises first and second housings 45 and 46 which are separated by a flexible diaphragm 47. Conduit 30 communicates with the interior of housing 45 so that the pressure in this conduit exerts a downward force on diaphragm 47. A third housing 48 is mounted adjacent housing 46 and a pair of flexible diaphragms 49 and 50 are positioned therebetween. Diaphragms 49 and 50 are separated by porous material 51, and the region therebetween is vented to atmosphere through a port 52. Conduit 32 communicates with a chamber 54 in housing 48 through a passage 55 and with a chamber 56 above diaphragm 49 through a passage 57 which has a restriction 58 therein. Outlet conduit 33 communicates with a chamber 60 beneath diaphragm 50 and with a chamber 61 beneath diaphragm 47.

Chambers 54 and 60 are connected by a valve which comprises a ball 63 that is adapted to engage a valve seat 64. A spring 65 normally urges ball 63 into engagement with valve seat 64. A rod 66 engages ball 63 and extends upwardly to form a valve head 67 which is adapted to restrict an orifice 68 which extends between chamber 60 and the region between diaphragms 49 and 50. A compression spring 70 normally urges the diaphragms upwardly to permit pressure from chamber 60 to be bled out to atmosphere through orifice 68 and port 52. Chambers 56 and 61 are separated by a valve which comprises a valve head 72 that is adapted to engage a valve seat 73. Valve head 72 is attached to diaphragm 47 so as to engage valve seat 73 when the diaphragm is depressed. A spring 75 is attached to diaphragm 47 at its lower end and to an adjusting rod 76 at its upper end. Rotation of rod 76 thus regulates the force exerted by spring 75 on diaphragm 47. Spring 75 is attached to adjusting rod 76 and to diaphragm 47 in a manner such that either a compression force or a tension force can be exerted on the diaphragm.

It should be evident that the force exerted on the top of diaphragm 47 is the sum of the forces exerted by spring 75 and the pressure in conduit 30. Spring 75 exerts a compression force in pressure regulator 31 so that the total force exerted on diaphragm 47 is greater than the force exerted by the pressure in conduit 30 by a predetermined amount which establishes the upper limit of the controller. Pressure regulator 36 is identical to regulator 31 except that rod 76 is adjusted so that spring 75 is in tension. The force exerted on diaphragm 47 is thus less than the force exerted by the pressure in conduit 30 by a predetermined amount which establishes the lower limit.

The pressure supplied by conduit 32 is transmitted through restriction 58 to chamber 56 and through the ball valve to chamber 60. The regulated pressure in chamber 60 is less than the supply pressure due to the leakage through passage 68. Spring 70 exerts an upward force on diaphragm 50 to balance this pressure differential. Chambers 56 and 61 are in communication through the uppermost valve. The forces exerted on the top of diaphragm 47 establish the setting of this uppermost valve and the rate at which pressure is transmitted through the valve. It should be evident that the various forces establish a condition of balance such that the outlet pressure in conduit 33 is maintained at a predetermined value which is either greater or less than the pressure in conduit 30, depending on the force exerted by spring 75. This pressure regulator is a commercially available item and does not form a part of the invention per se. It should be evident that other types of biased pressure regulators known in the art can be employed for this purpose.

A suitable 1:1 relay for use as element 34 is illustrated schematically in Figure 3. This relay comprises two housings 80 and 81 which are separated by a flexible diaphragm 82. Conduit 33 communicates with a chamber 83 above diaphragm 82, and conduit 40 communicates with a chamber 84 below diaphragm 82. Inlet conduit 14 communicates with a chamber 85 in housing 81. Chambers 85 and 84 are connected by a valve which comprises a ball 86 that engages a valve seat 87. A spring 89 normally urges ball 86 into engagement with the valve seat. Ball 86 is connected by a rod 88 to diaphragm 82. The force exerted on diaphragm 82 by the pressure in conduit 33 regulates the seating of the valve to establish the pressure in outlet conduit 40. As long as the pressure in conduit 14 is less than the pressure in conduit 33, the pressure in conduit 40 is equal to the pressure in conduit 14 because the valve is open. If the pressure in conduit 14 exceeds the pressure in conduit 33, the output pressure in conduit 40 becomes equal to the pressure in conduit 33.

A suitable high pressure selector for use as element 39 is illustrated schematically in Figure 4. This selector comprises housings 90 and 91 which are separated by a flexible diaphragm 92. Conduits 38 and 40 communicate with respective chambers 93 and 94 on the two sides of diaphragm 92. Outlet conduit 41 communicates with both of the chambers 93 and 94. If the pressure in conduit 38 exceeds the pressure in conduit 40, diaphragm 92 is moved downwardly to block the opening between conduit 40 and chamber 94. The output pressure in conduit 41 then becomes the pressure in conduit 38. If the pressure in conduit 40 exceeds the pressure in conduit 38, the opening between conduit 38 and chamber 93 is blocked by diaphragm 92 so that the output pressure becomes the pressure in conduit 40. The relay of Figure 3 and the pressure selector of Figure 4 are also commercially available items. It should be evident that other types of such equipment known in the art can be employed.

In Figure 5 there is shown a schematic circuit drawing of an embodiment of the limit system of this invention which is adapted to be used with electrical controllers. The measured variable to be regulated is converted to an electrical signal by a suitable transducer, not shown. This signal is applied from terminals 100 and 101, the latter being grounded, to the input of a conventional electrical controller 102. A preselected voltage representing the set point of the controller is established by a potentiometer 103 which is connected across a voltage source 104. The voltage at the contactor of potentiometer 103, which is designated $E_s$, is applied to controller 102. Controller 102 establishes an output voltage $E_c$. This is the voltage which is limited by the system of the present invention.

Set point voltage $E_s$ is applied through a phase reversal amplifier 128 having unity gain to establish a signal $-E_s$. This signal is applied through an isolating resistor 105 to a first summing amplifier 106 and through an isolating resistor 107 to a second summing amplifier 108. The signal $E_c$ is applied through an isolating resistor 109 to amplifier 106 and through an isolating resistor 110 to amplifier 108. A positive reference voltage B is supplied by a potentiometer 111 which is connected across a voltage source 112. This reference voltage is applied through an isolating resistor 113 to amplifier 106. A negative reference voltage $-A$ is established by a potentiometer 114 which is connected across a voltage source 115. This reference voltage is applied through an isolating resistor 118 to amplifier 108. Summing amplifier 106 is provided with a first feedback network which comprises a rectifier 120 and an isolating resistor 121 and with a second feedback network which comprises a rectifier 122 and an isolating resistor 123. Rectifiers 120 and 122 are connected in opposite directions. The junction between rectifier 120 and resistor 121 is connected through an isolating resistor 130 to a third summing amplifier 131. The junction between rectifier 126 and resistor 127 is connected through an isolating resistor 132 to amplifier 131. The output signal of controller 102 is applied through an isolating resistor 133 to amplifier 131. The output signal of amplifier 131 is applied through a phase reversal amplifier 135 which has a unity gain to output terminals 136 and 137. The voltage between these terminals represents the limited control signal.

Potentiometer 111 is regulated manually so that voltage B represents the amount the desired lower limit is to be less than the controller output signal. Similarly, the contactor of potentiometer 114 is set so that the voltage $-A$ represents the amount the desired upper limit is to be greater than the controller output signal. The voltages $E_c$, B and $-E_s$ are summed by the amplifier 106. As long as the controller output voltage $E_c$ does not exceed the limited set point voltage $(-E_s+B)$, the output of amplifier 106 remains negative so that the feedback is through rectifier 122. The voltage at the junction between rectifier 120 and resistor 121 is zero so that no signal is applied to amplifier 131 through resistor 130. If the controller output signal $E_c$ exceeds the upper set point signal, the output signal from amplifier 106 becomes positive so that conduction takes place through rectifier 120. The resulting feedback signal $$-(E_c-E_s+B)$$

is applied through resistor 130 to summing amplifier 131. This signal is thus added to the signal $E_c$ so that output of the summing amplifier is $-[E_c-(E_c-E_s+B)]$ or $-(E_s-B)$. The signal between terminals 136 and 137 becomes $E_s-B$ which is the lower limit.

As long as the controller output signal $E_c$ exceeds the lower set point signal $(-E_s-A)$, the output signal of summing amplifier 108 is positive so that rectifier 124 conducts. If the control signal $E_c$ should become less than the set point signal $(-E_s-A)$, the output signal of amplifier 108 is negative so that rectifier 126 conducts. This applies a feedback signal $-(E_c-E_s-A)$ through resistor 132 to summing amplifier 131. The resulting output signal from the summing amplifier thus becomes $$-[E_c-(E_c-E_s-A)] \text{ or } -(E_s+A)$$

The signal between terminals 136 and 137 becomes $E_s+A$ which is the upper limit.

In view of the foregoing description it should be apparent that there is provided in accordance with this invention a novel floating limit system for restricting the output signals of controllers. The apparatus of this invention can readily be adapted to conventional electrical or pneumatic controllers to limit the output signals thereof. The unique feature of this invention resides in the floating limit mechanism which permits the limit points to bracket the desired set point by a predetermined amount regardless of the setting of the set point. Limit switches available heretofore have not been capable of operating in this manner.

While the invention has been described in conjunction with present preferred embodiments, it should be evident that it is not limited thereto.

What is claimed is:

1. A limit system for a process controller which establishes an output signal representative of a measured variable and which is provided with an adjustable set point comprising means responsive to said set point to establish a first signal representative thereof, means responsive to said first signal to establish a second signal which is greater than said first signal by a preselected value, means responsive to said first signal to establish a third signal which is less than said first signal by a preselected value, means responsive to said output signal and said second signal to establish a fourth signal which is representative of said output signal when said output signal is less than said second signal and which is representative of said second signal when said output signal is greater than said second signal, and means responsive to said third and fourth signals to establish a fifth signal which is representative of the larger of said third and fourth signals.

2. A limit system for a process controller which establishes an output pneumatic pressure representative of a measured variable and which is provided with an adjustable set point comprising means responsive to said set point to establish a first pneumatic pressure representative thereof, means responsive to said first pneumatic pressure to establish a second pneumatic pressure which is greater than said first pneumatic pressure by a preselected value, means responsive to said first pneumatic pressure to establish a third pneumatic pressure which is less than said first pneumatic pressure by a preselected value, means responsive to said output pneumatic pressure and said second pneumatic pressure to establish a fourth pneumatic pressure which is representative of said output pneumatic pressure when said output pneumatic pressure is less than said second pneumatic pressure and which is representative of said second pneumatic pressure when said output pneumatic pressure is greater than said second pneumatic pressure, and means responsive to said third and fourth pneumatic pressure to establish a fifth pneumatic pressure which is representative of the larger of said third and fourth pneumatic pressures.

3. The limit system of claim 2 wherein said means to establish said second pneumatic pressure comprises a biased pressure regulator, said means to establish said third pneumatic pressure comprises a biased pressure regulator, said means to establish said fourth pneumatic pressure comprises a pneumatic 1:1 relay, and said means to establish said fifth pneumatic pressure comprises a high pressure selector means.

4. A limit system for a process controller which establishes an output electrical signal representative of a measured variable and which is provided with an adjustable set point comprising means responsive to said set point to establish a first electrical signal representative thereof, means responsive to said first electrical signal to establish a second electrical signal which is greater than said first electrical signal by a preselected value, means responsive to said first electrical signal to establish a third electrical signal which is less than said first electrical signal by a preselected value, means responsive to said output electrical signal and said second electrical signal to establish a fourth electrical signal which is representative of said output electrical signal when said output electrical signal is less than said second electrical signal and which is representative of said second electrical signal when said output electrical signal is greater than said second electrical signal, and means responsive to said third and fourth electrical signals to establish a fifth electrical signal which is representative of the larger of said third and fourth electrical signals.

5. A limit system for a process controller which establishes an output electrical signal representative of a measured variable and which is provided with an adjustable set point comprising first, second and third electrical signal summing means, means to apply said output signal to the inputs of said first, second and third summing means, means to establish a first reference electrical signal and to apply same to the input of said first summing means, means to establish a second reference electrical signal and to apply same to the input of said second summing means, means responsive to said set point to establish an electrical signal and to apply same to said first and second summing means, first and second feedback networks connected to each of said first and second summing means, said first networks becoming conductive when the output signals from the associated summing means exceed predetermined values and said second networks becoming conductive when the output signals from the associated summing means become less than predetermined values, and means to apply the signals transmitted by said first network of said first summing means and said second network of said second summing means to the input of said third summing means.

6. The limit system of claim 5 wherein said means to establish said reference signals comprise adjustable voltage sources, said summing means comprise summing amplifiers, and said feedback networks comprise rectifiers.

7. A limit system for a process controller which establishes an output electrical signal representative of a measured variable and which is provided with an adjustable set point comprising first, second and third summing amplifiers, means to apply said output signal to the inputs of said amplifiers, means to apply a reference potential of positive polarity to the input of said first summing amplifier, means to apply a reference potential of negative polarity to the input of said second summing amplifier, means responsive to said set point to establish a negative potential and to apply same to the inputs of said first and second summing amplifiers, first, second, third and fourth rectifiers, means connecting said first and second rectifiers between the outputs and inputs of said first and second summing amplifiers, respectively, to permit conduction toward said inputs, means connecting said third and fourth rectifiers between the outputs and inputs of said first and second summing amplifiers, respectively, to permit conduction toward the outputs thereof, and means connecting the signals passed by said second and third rectifiers to the input of said third summing amplifier.

References Cited in the file of this patent
UNITED STATES PATENTS 2,831,107     Raymond et al. _____ Apr. 15, 1958